Nov. 12, 1940.  D. G. BRANDT  2,221,469

PIPE STILL FURNACE AND METHOD OF HEATING HYDROCARBONS

Filed March 18, 1939  2 Sheets-Sheet 1

INVENTOR
DAVID G. BRANDT
BY
ATTORNEY

Nov. 12, 1940.   D. G. BRANDT   2,221,469
PIPE STILL FURNACE AND METHOD OF HEATING HYDROCARBONS
Filed March 18, 1939   2 Sheets-Sheet 2
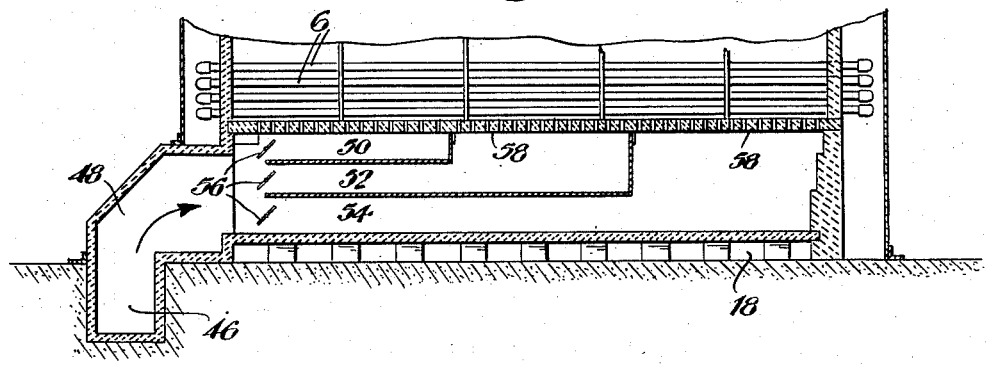
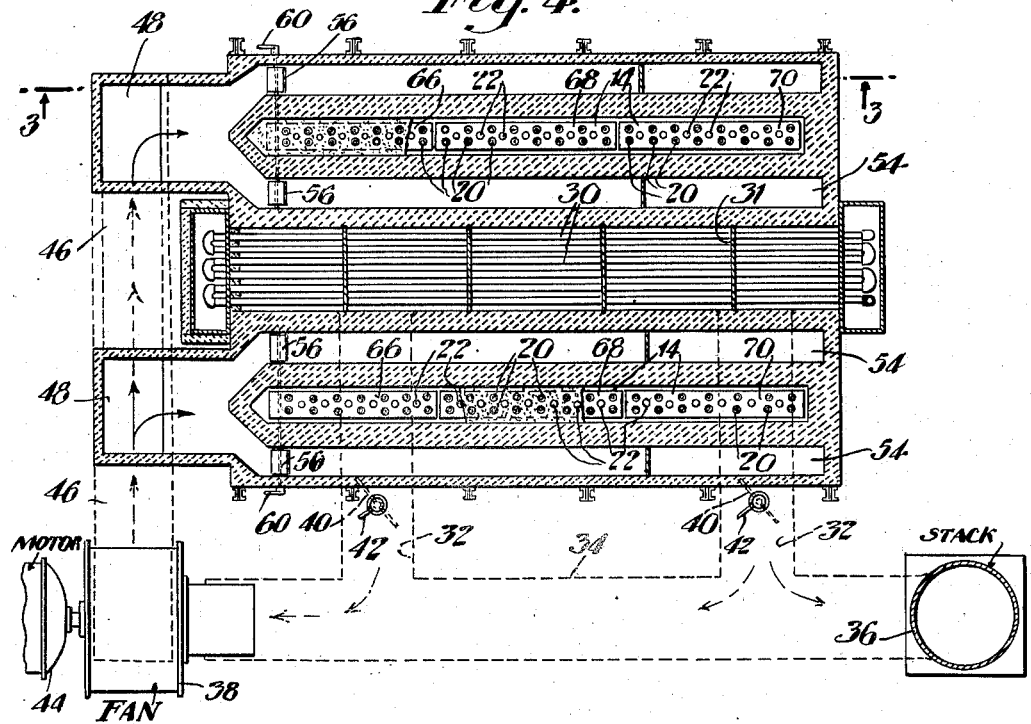
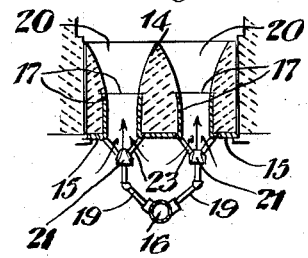
INVENTOR
DAVID G. BRANDT
BY
ATTORNEY Patented Nov. 12, 1940

2,221,469

UNITED STATES PATENT OFFICE 2,221,469

PIPE STILL FURNACE AND METHOD OF HEATING HYDROCARBONS

David G. Brandt, Westfield, N. J., assignor to Power Patents Company, Hillside, N. J., a corporation of Maine Application March 18, 1939, Serial No. 262,627

9 Claims. (Cl. 196—116)

This invention relates to improvements in pipe still furnaces and method of heating. More particularly the invention relates to a tubular heater for heating hydrocarbons to be cracked, converted or distilled, and to a method of operating a pipe still heater to more effectively heat hydrocarbons for such purposes.

Considerable improvement has been made in the provision of suitable pipe still furnaces for heating hydrocarbons and in the control of heating operations, but considerable difficulty is still encountered in the direct application of radiant heat to tubes through which hydrocarbons are conducted. The primary aim of the present invention is to provide an improvement on present types of pipe still furnaces and their method of operation.

The salient object of the invention is to provide an improved pipe still furnace in which the tubes in the radiant heating section are supplied with radiant heat in accordance with their position with respect to the radiant heating means.

Another object of the invention is to provide an improved method of heating or operation of a pipe still furnace which will permit the control of conditions in the radiant section of the furnace in accordance with certain specific objects to be accomplished.

In accordance with these and other objects which will be apparent from a detailed description of the invention, the improved pipe still furnace comprises one or more radiant heating chambers of relatively great length compared with their width, heating tubes mounted on the side walls of the chamber, a firing pit opening into the bottom of each radiant heating chamber and extending substantially the entire length thereof, a row of burners in the bottom of the firing pit, and means for recirculating flue gas from the furnace, back into the radiant heating chambers and for distributing it over the tubes mounted along the side walls of the chambers. The improvements of the present invention also include certain features of operation in which the temperature in different sections along the radiant heating chambers are controlled individually by regulating the proportion of recirculated flue gas introduced into various sections of the radiant heating chambers. The radiant heating may also be controlled along the heating chambers by regulating the supply of combustible material to different sections of the burners discharging into the combustion pits.

Other features, objects and advantages of the improved pipe still heater and method of heating, of the present invention, will be apparent to those skilled in the art from the following more detailed description thereof taken in connection with the accompanying drawings in which:

Fig. 3 is a broken longitudinal vertical sectional view taken on the line 3—3 of Fig. 4.

Fig. 4 is a horizontal sectional view taken on the line 4—4 of Fig. 2 and showing the flue gas recirculation passageways.

Fig. 5 is an enlarged sectional view of a portion of the burner arrangement shown in Fig. 2.

Figure 1:
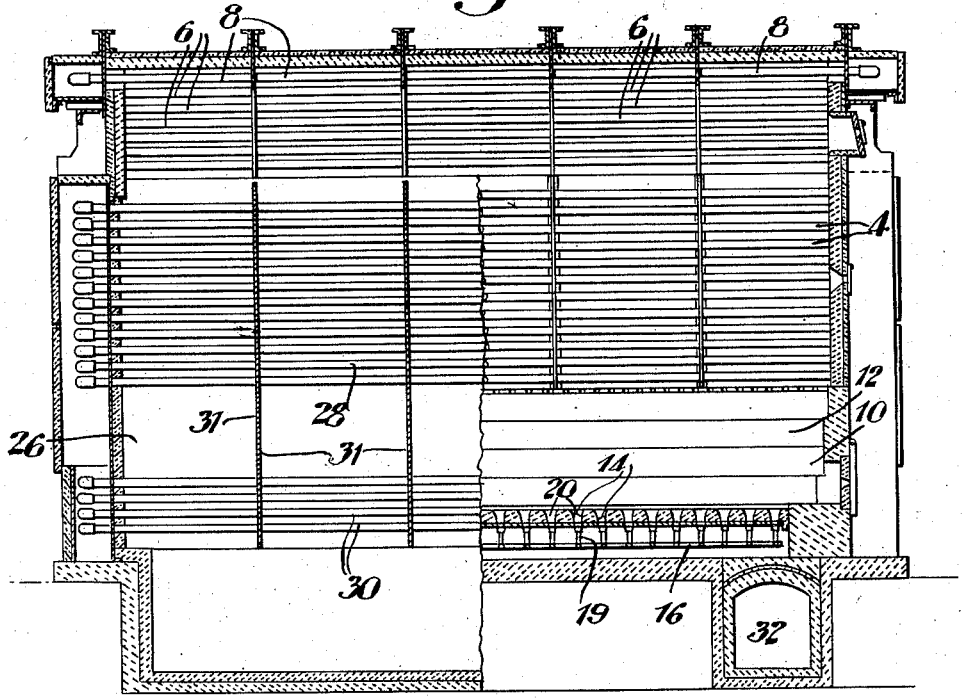
Fig. 1 is a broken longitudinal vertical sectional view of the improved pipe still furnace taken on the lines 1—1 of Fig. 2.
Figure 2:
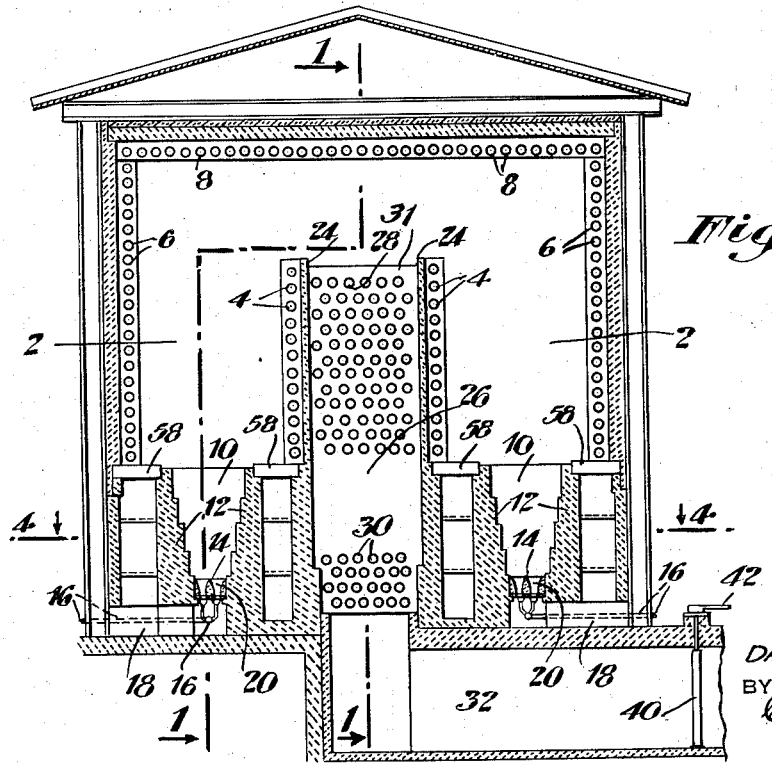
Fig. 2 is a vertical cross-sectional view of the improved pipe still furnace showing the relationship of the heating chambers and positions of the various tube banks.

The improved pipe still furnace of the present invention comprises a masonry structure composed of outside supporting walls secured to steel beams and inside refractory brick lining. Referring to Fig. 2, the improved furnace comprises one or more radiant heating chambers 2. In the present instance two such chambers are provided and the furnace made symmetrical. These heating chambers 2 are relatively long narrow chambers provided with an inside row of wall heating tubes 4 and an outside row of wall heating tubes 6, used for the heating of hydrocarbons. The whole furnace is provided with one or more rows of roof heating tubes 8 which preferably extend under the entire roof of the furnace. All tubes are supported in metal tube brackets or supports as shown.

The wall and roof tubes of each radiant heating chamber 2 are supplied with radiant heat from a long firing pit 10 which extends substantially the full length of the heating chamber. These pits are lined with high temperature refractory material and are preferably constructed with upwardly diverging side walls 12 which may be made in step-like fashion as shown or with a smooth slope. The pits 10 are of substantial depth, and the walls 12 converge down to burner units 14 which are preferably made up in sections as shown in Fig. 4, the burners of which have the structure shown in Fig. 5. Fuel is supplied to the burners through pipes 16, and air for combustion is supplied to the passageway below the burner units through air ducts 18.

Each burner section comprises a plurality of burner openings 20 into which the fluid fuel is injected, which in turn induces a flow of air through the openings. In each of the burner sections there is also a plurality of openings 22 for the admission of secondary air to the space above the section. The structure of the burner units 14 is shown more in detail in the broken sectional view of Fig. 5, in which the burner unit is shown as comprising a steel supporting plate 15 containing the proper holes corresponding to the openings 20. The lower portion of the openings 20 each comprises a short flaring tubular section of cast iron 17 set in the holes in the steel plate 15. The burner units are then formed by filling in around the cast iron sections 17 with plastic refractory material to form the flaring outer portion of the openings 20. The whole unit on the plate 15 which may be from 4 to 8 feet in length is cast, dried, and fired. The fluid fuel and air is supplied to the lower portion of the openings 20 from the fuel pipe 16, by means of branch pipes 19 which terminate in burner tips 21, which are in turn provided with braces 23 for positioning the burner tips with respect to the openings 20. The jetting of the fluid fuel through the burner tips induces a flow of air around the braces 23 and into the openings 20. As combustion takes place in the pits 10, the combustion gases expand into the increasing cross-sectional area of the burner pits. The diverging walls 12 (in the direction of flow of the gases) permit the expansion of the gases during combustion without substantially increasing their velocity.

The high temperature combustion in the burner pits 10 heats the walls 12 to extremely high temperatures, so that they provide the radiant heating surfaces which reflect onto the tubes of the banks 4, 6 and 8. The walls of the combustion pits are so arranged that the wall tubes 4 and 6 closest to the pit are exposed to a smaller area of the radiant walls 12 than are the tubes at greater distances from the pit. This arrangement prevents overheating of the tubes close to the combustion pit and at the same time provides adequate radiant heating surface for the tubes at greater distances from the pit. The radiant surfaces may be accurately arranged so that all tubes will be heated to approximately the same degree.

The combustion gases discharged from the pit 10 flow up through the radiant heating chambers 2 and over bridge walls 24 into a convection heating chamber 26 in which are mounted tube banks 28 and 30, and supported by spaced tube sheets 31. A considerable part of the heat in the combustion gases is removed by the tube banks 28 and 30, after which the gases then flow through the end discharge ducts 32 into a passageway 34 (Fig. 4), from which they pass to a stack 36 or to a recirculation flue gas fan 38, or both. The ducts 32 are provided with control dampers 40 which may be operated by handles 42 to control the proportion of flue gases discharged through each duct.

An important feature of the present invention is the recirculation of flue gases back into the radiant heating chambers to aid in controlling the heating operation. The gases to be recirculated are picked up by the fan 38 which is operated by a motor 44, (Fig. 4) and conducted through a main passageway 46 into distribution headers 48 for each of the radiant heating chambers 2. From each of the headers 48 the recirculated flue gases are passed to distribution ducts on each side of the burner pits and beneath the wall tubes 4 and 6. As shown for example in Fig. 3, the flue gases are conducted from the header 48 through separate passageways 50, 52 and 54 which lead respectively to the front, middle and far end sections of the furnace. The proportion of flue gas introduced into each of these passages is controlled by a damper 56. The flue gas introduced through passageways 50, 52 and 54 are distributed directly under the wall tubes through openings between the fire brick 58 which are mounted in spaced relation directly below the rows of wall tubes 4 and 6, on each side of the chambers 2. The dampers 56, for controlling the supply of recirculated flue gas to both sets of passages 50, 52 and 54 for each radiant heating chamber, may, if desired, be operated together by handles 60, as shown in Fig. 4. The dampers 56 may be operated individually to effect any desired control.

Instead of dividing the radiant heating chamber lengthwise into three sections with respect to the return of flue gases, it may be divided into any desired number of sections, each provided with individual control. The structure as shown provides for the control of the recirculated flue gas introduced into any section of each radiant heating chamber by suitable manipulation of the dampers 56. For example, all of the flue gases returned to one of the radiant heating chambers may be introduced through the opposite passageways 54, or dampers 56 may be adjusted to exactly proportion the return of flue gas to the whole length of the heating chamber through the passages 50, 52 and 54, which would be impossible if the furnace were not divided into sections for control.

The burners 14 mounted in the bottom of the combustion pits are preferably operated in sections coresponding to the sections of control provided for the return of flue gases, so that, as shown in Fig. 4, burner sections 66, 68 and 70 are provided for each combustion pit. These sections are preferably supplied with fluid fuel, such as combustible gas or oil, under separate control, so that the heating in any given section of the furnace may be increased or decreased at will, depending on the result desired to be accomplished.

In heating the tubes 4 and 6 in either heating chamber 2, the burner sections may be operated for example by supplying most of the fuel to the section 66 and only moderately firing the burner sections 68 and 70. In such a case, the flue gas returned to the chamber may be introduced to the greatest extent through the passageways 50 for that chamber by controlling the dampers 56 thereto. This will provide adequate protection for the portions of the tubes opposite the burner section 66. The heating in this particular chamber may be further controlled by closing the flue gas outlet 32 to the left in Fig. 4, so that most of the flue gas is discharged from the opposite end of the furnace. This will cause a flow of combustion gases from left to right in the radiant heating chamber and supply more heating gases to the right sections of the convection heating chamber 26 containing tube banks 28 and 30.

Various other modifications may be made in the operation of the burners and flue gas return passages to accomplish any desired result or effect, and one of the radiant heating chambers 2 may be operated to supply considerably more heat than the other if desired or necessary, in carrying out a particular operation.

The banks of heating tubes mounted in the radiant heating chambers and convection chamber may be connected in various ways to accommodate any kind of distillation, cracking, or conversion operation. For example, a relatively cool hydrocarbon to be heated may be passed first through the tube bank 30 countercurrent to the combustion gases, then divided in two streams, which are passed separately through the wall tubes 4 and then through the wall tubes 6 in the two radiant heating chambers 2. Finally the separate streams may be passed in series through half of the roof tubes 8, after which the streams are combined and passed through the convection tube bank 28.

The furnace may be utilized for heating two separate streams of hydrocarbons, for example, a stream of gas oil and a stream of "butane". One of these streams may be passed through the convection bank 30, the wall tubes 4 and 6, and through half of the roof tubes 8 of the right radiant heating chamber (Fig. 2), while the other stream of hydrocarbon is heated in the left radiant chamber by being conducted through the wall tubes 4 and 6, and the other half of the roof tubes 8. If desired, the two streams may be heated to different temperatures and then combined and conducted through the convection tube bank 28.

In using the furnace to heat a single hydrocarbon or mixture, the hydrocarbon may be passed in series through tube banks 30, 28, roof tubes 8, wall tubes 6 and 4 of the right radiant heating chamber, and then through wall tubes 4 and 6 in the left radiant heating chamber 2. The control and manipulation of the burner sections for the different radiant heating chambers 2 will depend to a considerable extent upon the cycle by which the hydrocarbon passes through the furnace. This is also true with respect to the control of the flue gas recirculated through the furnace sections. Furthermore, the degree of protection required for the different wall tubes will depend upon the character of the hydrocarbon passed through these tubes and the temperatures at which it is heated therein.

Various modifications may be made in the furnace, and its operation, without departing from the spirit and scope of the invention as defined by the accompanying claims.

Having thus described the invention in its preferred form, what is claimed as new is:

1. In a pipe still heater for heating hydrocarbons, the improvement which comprises a radiant heating chamber having a relatively greater length than width, tubes for heating hydrocarbons mounted in substantially horizontal position along the side walls of said chamber, a firing pit opening into the bottom of said chamber and extending substantially the entire length thereof, said pit being relatively deep and having diverging side walls of relatively great area adapted when highly heated to reflect and radiate heat directly onto said tubes, a row of burners in the bottom of said pit extending substantially the entire length thereof, and said pit walls being arranged in such a way that the lowermost tubes in the chamber are exposed to radiation from a smaller pit wall area than the tubes mounted at higher positions in the chamber.

2. In a pipe still furnace for heating hydrocarbons which includes a radiant heating chamber of relatively great length compared to its width, and in which tubes for the passage of hydrocarbons are mounted in substantially horizontal position on the side walls of said chamber, the improvement which comprises a relatively deep firing pit opening into the bottom of said chamber and extending substantially the entire length thereof, the side walls of said pit being of relatively great area and when highly heated adapted to radiate heat onto said tubes, said pit walls being arranged in such a way that the tubes nearest the pit are exposed to radiation from a smaller pit wall area than the tubes mounted at greater distances from the pit, a row of burners mounted in the bottom of said pit and extending substantially the entire length thereof, and means for passing relatively cool combustion gases upwardly along the entire side walls of said chamber over said tubes to partially blanket the tubes against contact with hot combustion gases from said pit.

3. In a pipe still furnace for heating hydrocarbons which includes a radiant heating chamber of relatively great length compared to its width, and in which tubes for the passage of hydrocarbons are mounted on the side walls of said chamber, the improvement which comprises a relatively deep firing pit opening into the bottom of said chamber and extending substantially the entire length thereof, a row of burners extending along the bottom of said pit adapted to heat the walls of the pit to incandescence, each side wall of said pit being adapted to radiate heat to the tubes mounted on the opposite chamber wall, and said pit walls being arranged in such a way that the tubes nearest the pit are exposed to radiation from a smaller pit wall area than the tubes mounted at greater distances from the pit.

4. In a pipe still furnace for heating hydrocarbons which includes a radiant heating chamber of relatively great length compared to its width, and in which tubes for the passage of hydrocarbons are mounted on the side walls of said chamber, the improvement which comprises means along each side of said chamber for distributing recirculated combustion gases over the tubes mounted on said side walls, a radiant firing pit opening into the bottom of said chamber between said means and extending substantially the entire length of said chamber, said pit including diverging refractory side walls each adapted to radiate heat onto the tubes mounted on the opposite side wall of said chamber.

5. In a pipe still furnace for heating hydrocarbons which includes a radiant heating chamber of relatively great length compared to its width, and in which tubes for the passage of hydrocarbons are mounted on the side walls of said chamber, the improvement which comprises a relatively deep firing pit opening into the bottom of said chamber and extending substantially the entire length thereof, the side walls of said pit being adapted to radiate heat onto said tubes, a row of burners mounted in the bottom of said pit and extending substantially the entire length thereof, and means for passing relatively cool combustion gases upwardly along the entire side walls of said chamber over said tubes to partially blanket the tubes against contact with hot combustion gases from said pit, said means including a fan for drawing said gases from the outlet of said furnace, sectional passages below said side walls for different longitudinal portions of said furnace, and control means for controlling the distribution of said relatively cool combustion gases to said sections.

6. A pipe still furnace as defined by claim 4 in which said means along each side of said chamber for distributing recirculated combustion gases over the tubes mounted on said side walls includes a separately-controlled conduit for distributing said gases to definite longitudinal sections along each side of said chamber, burner sections in the bottom of said firing pit corresponding in position to said definite sections for distribution of recirculated combustion gases, and means for separately controlling said burner sections.

7. In a pipe still furnace for heating hydrocarbons which includes a radiant heating chamber of relatively great length compared to its width and in which tubes for the passage of hydrocarbons are mounted on the side walls of said chamber, the improvement which comprises separate means for supplying recirculated combustion gases along each side of said chamber to definite longitudinal sections thereof, said gases being distributed over the tubes mounted on the side walls of said chamber, a radiant firing pit opening into the bottom of said chamber between said combustion gas supplying and distributing means and extending substantially the entire length of said chamber, said pit including diverging refractory side walls each adapted to radiate heat onto the tubes mounted on the opposite side walls of said chamber, and longitudinal burner sections mounted in the bottom of said pit and corresponding in length and position to approximately the separate longitudinal sections for the distribution of recirculated combustion gases to said chamber.

8. A pipe furnace for heating hydrocarbons as defined by claim 7 in which said furnace is provided with a flue gas outlet at each end of the furnace, and means for controlling the proportion of flue gases discharged from said furnace through said flue gas outlet, whereby the flue gases produced in said furnace may be shifted longitudinally in said furnace to correlate the control exercised on said burner sections and the sections for distribution of recirculated combustion gases.

9. In a pipe still heater for heating hydrocarbons, the improvement which comprises a radiant heating chamber having a relatively greater length than width, tubes for heating hydrocarbons mounted along the side walls of said chamber, a firing pit opening into the bottom of said chamber and extending substantially the entire length thereof, said pit being relatively deep and having diverging side walls adapted to reflect directly onto said tubes, separately controlled relatively long burner sections mounted in longitudinal series in the bottom of said pit and extending substantially the entire length thereof, a flue gas outlet from each end of said furnace, and means for controlling the proportion of flue gases discharged from said furnace through said flue gas outlets.

DAVID G. BRANDT.